United States Patent [19]

Casari

[11] Patent Number: 5,197,445

[45] Date of Patent: Mar. 30, 1993

[54] FUEL-SUPPLY SYSTEM FOR AN INTERNAL COMBUSTION ENGINE

[75] Inventor: John Casari, Manchester, Mich.

[73] Assignee: Robert Bosch GmbH, Stuttgart, Fed. Rep. of Germany

[21] Appl. No.: 754,674

[22] Filed: Sep. 4, 1991

[30] Foreign Application Priority Data

Sep. 4, 1990 [DE] Fed. Rep. of Germany ....... 4027947

[51] Int. Cl.$^5$ .............................................. F02M 37/04
[52] U.S. Cl. ..................................... 123/514; 123/557; 137/576
[58] Field of Search ............ 123/509, 510, 514, 179.17, 123/497; 137/576, 572, 574, 571, 432, 433

[56] References Cited

U.S. PATENT DOCUMENTS

| 2,599,699 | 6/1952 | Dilworth | 123/514 |
|---|---|---|---|
| 4,454,848 | 6/1984 | Duprez | 123/557 |
| 4,502,450 | 3/1985 | Duprez | 123/514 |
| 4,600,825 | 7/1986 | Blazejovsky | 123/557 |
| 4,850,327 | 7/1989 | Fayard | 123/514 |
| 4,928,657 | 5/1990 | Asselin | 123/514 |
| 4,974,570 | 12/1990 | Szwargulski | 123/514 |
| 5,050,567 | 9/1991 | Suzuki | 137/576 |
| 5,080,077 | 1/1992 | Sawert | 137/574 |
| 5,085,198 | 2/1992 | Bartlett | 123/557 |

FOREIGN PATENT DOCUMENTS 0173350 7/1990 Japan ................................... 137/571

Primary Examiner—Carl S. Miller
Attorney, Agent, or Firm—Walter Ottesen

[57] ABSTRACT

The invention is directed to a system for supplying an internal combustion engine with fuel which includes the following components: a tank; a reservoir for fuel; a pump; a switchover valve, to which the tank, the reservoir and the pump are connected; a metering device to meter fuel to the intake air; a feed line to feed fuel from the pump to the metering device; a line into the reservoir for refilling the reservoir with a component flow of fuel pumped by the pump; and a control unit for driving the pump, the metering device and the switchover valve. The control unit is configured so that it switches the switchover valve in case of a just started engine, so that the fuel is pumped by the pump out of the reservoir into the feed line, and when the engine is warm, the switchover valve is switched so that the pump pumps fuel from the tank into the feed line.

6 Claims, 1 Drawing Sheet

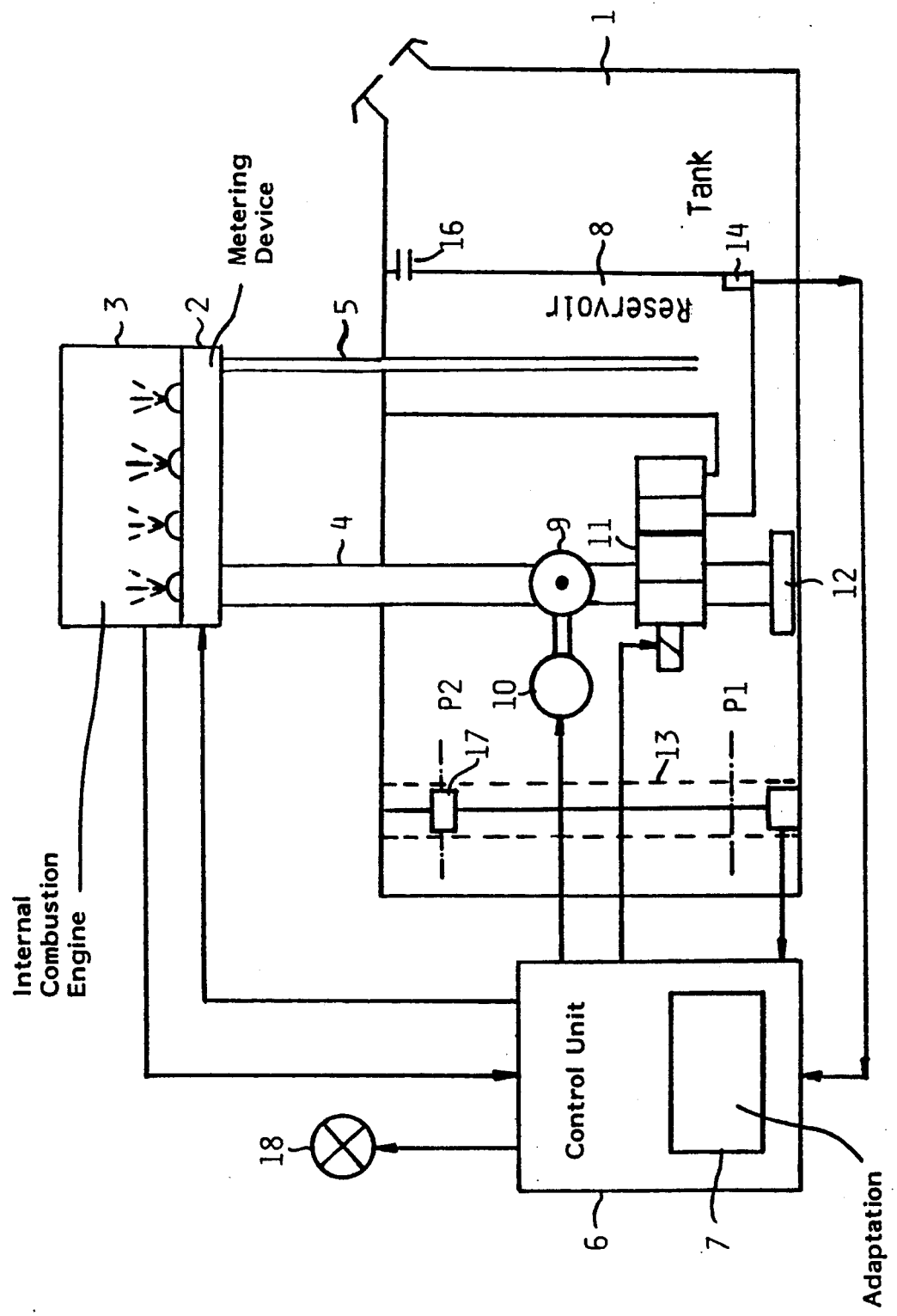

FUEL-SUPPLY SYSTEM FOR AN INTERNAL COMBUSTION ENGINE

FIELD OF THE INVENTION

The invention relates to a system for supplying fuel to an internal combustion engine.

BACKGROUND OF THE INVENTION

Every conventional system of the kind referred to above includes the following elements: a tank; a pump; a metering device for metering fuel to the intake air; a feed line for feeding the fuel from the pump to the metering device; and, a control unit for driving the pump and the metering device.

Motor vehicles equipped with internal combustion engines adapted to burn different fuels such as gasoline or gasoline/methanol mixtures are usually equipped with a sensor for measuring the composition of the pumped fuel. The signals of such a sensor make it possible to adapt precontrol values for the metering of fuel to the particular fuel composition. Precontrol values are applied on a test stand for a pregiven type of fuel such as gasoline. During operation of the engine, these precontrol values such as injection times are adapted with the aid of an adaptation to the particular operating conditions. The adaptation to the particular fuel composition takes place with the aid of the signal of the above-mentioned sensor which measures the fuel composition. If injection times for the use of gasoline are applied, then these injection times should be extended, for example by approximately 50%, when the above-mentioned sensor announces that the actual tank content comprises approximately 50% gasoline and 50% methanol.

It is a continuous effort to use as few sensors as possible in the area of motor vehicle electronics. Accordingly, various suggestions have been made to eliminate the above-mentioned sensor for detecting the fuel composition. U.S. Pat. No. 5,094,208 discloses a method wherein the control deviation in the lambda control loop is measured after each tank refill and an adaptation value is so changed that the detected control deviation is eliminated. This method has the disadvantage that it can only function when the lambda control is active; however, this is not the case especially for cold engines. However, even for warm engines, the method is problematical because of the abrupt change of the adaptation value since this procedure can easily lead to control oscillations.

U.S. Pat. No. 5,121,732 discloses various methods which operate to render even cold engines operationally ready when the fuel composition has changed greatly after a tank refill, for example, when a tank containing gasoline has been driven until almost empty and then filled with a fuel comprising for the most part methanol. The fuel composition present is estimated with the aid of the tank conditions before and after tanking and upon the basis of the data of the fuel to be purchased. The precontrol values are then changed for the operation of the engine with fuels of the possible compositions and an investigation is made with which composition the machine will best operate. Control is continued then with these values. Independently of whether the method is applied to a cold engine or not, an adaptation with a short time constant is carried out when the lambda control is released and after filling the tank.

These methods too however present problems for example because the above-mentioned rapid adaptation brings about a slight tendency of control oscillations but nonetheless not so intense as with the method according to the above-mentioned U.S. Pat. No. 5,094,208 wherein an abrupt change of the adaptation value takes place. Poor engine running can develop when operating the engine with values for the different possible compositions when control is made with just those estimated values which lie farthest from those which are applicable for the fuel composition which is actually present.

SUMMARY OF THE INVENTION

The problem nonetheless remained to provide a system for supplying an engine with fuel which is so configured that an operation of the engine free of disturbance as much as possible is then obtainable when fuel is added to the tank which is very different in its composition from the fuel which was supplied to the engine before retanking.

The system according to the invention for supplying an internal combustion engine with fuel includes the following components: a tank; a reservoir for fuel; a pump; a switchover valve, to which the tank, the reservoir and the pump are connected; a metering device to meter fuel to the intake air; a feed line to feed fuel from the pump to the metering device; a line into the reservoir filling the reservoir with a component flow of fuel pumped by the pump; and a control unit for driving the pump, the metering device and the switchover valve.

The control unit is configured so that it switches the switchover valve in case of a just started engine, so that the fuel is pumped by the pump out of the reservoir into the feed line, and when the engine is warm, the switchover valve is switched so that the pump pumps fuel from the tank into the feed line.

When a vehicle with the above kind of fuel-supply system is tanked, the composition of the fuel changes only in the tank but not in the reservoir. For a cold engine, fuel is pumped out of the reservoir that is, that fuel is pumped which was supplied to the engine before tanking. Fuel is pumped from the tank only when the engine is warm, that is, when an adaptation of the lambda control method can be carried out. The adaptation then adapts the precontrol to the new composition of the fuel. The reservoir is at the same time filled with fuel, preferably with fuel from a return line so that after a fresh tanking, fuel of the old composition will remain available for a given time. The content of the reservoir is determined so that this content is reliably sufficient to supply the engine with the old fuel until the engine is operationally warm even under unfavorable operating conditions. Preferably, the reservoir is selected to be so large that it contains a sufficient volume for several warm-up phases after retanking; this being for the case that the engine after tanking can be operated several times for so short a time that the engine cannot become operationally warm to an adequate extent for adaptive lambda control.

Adequate operational warmth of the engine can be determined, for example, by measuring the engine temperature. However, it is more advantageous to assume adequate operational warmth when the signal for enabling adaptive lambda control is emitted. This condition is selected because this is the time point from which the adaptive lambda control of the precontrol values can be undertaken as is required in order that the lambda control be adapted to a changed composition of the fuel.

Preferably, the system is so configured that after each tanking, the system estimates which fuel compositions are possible, for example, in the manner indicated above. Only then, when the composition, which is most disadvantageous for the metering of fuel to the intake air, is different by more than a pregiven difference from the composition present previously, is the switchover valve switched so that fuel from the reservoir is pumped rather than fuel from the tank.

The switchover valve is always switched over for pumping from the tank when a level sensor in the reservoir indicates that the reservoir is empty.

BRIEF DESCRIPTION OF THE DRAWING

The invention will now be described with reference to the drawing wherein the single figure is a schematic of a fuel-supply system for an internal combustion engine equipped with the following: a tank, a reservoir and a pump as well as a switchover valve for switching the pump inlet back and forth between the reservoir and the tank.

DESCRIPTION OF THE PREFERRED EMBODIMENTS OF THE INVENTION

The system shown in the figure includes a tank 1, a metering device 2 on an internal combustion engine 3, a feed line 4 between the tank and the metering device 2, a return line 5 between the metering device 2 and a reservoir 8 as well as a control unit 6 having adaptation 7. The following are mounted within the tank 1: the reservoir 8, a fuel pump 9 having an electric drive motor 10, an electrically driven switchover valve 11, an intake filter 12 and a level sensor 13. A level sensor 14 is disposed near the base of the reservoir 8.

The switchover valve 11 is switched back and forth by signals from the control unit 6 so that the valve 11 connects the input of the pump 9 either to the intake filter 12 or to the reservoir 8. The control is so configured that the switchover of the valve is carried out pursuant to the following considerations.

It is first assumed that the control unit 6 measures a low level P1 of the fuel in the tank at a first time point. This value is then stored before the ignition of the engine 3 is switched off. When the ignition is again switched on, a higher level P2 is present. If the level difference is above a pregiven value, the control unit 6 reaches the conclusion from this difference that a tanking has taken place. It is further assumed that the engine 3 is such an engine which can be operated with different fuels, especially gasoline/methanol mixtures of different compositions. In this case, it cannot be precluded that the operator of the vehicle tanked another fuel blend than was previously in the tank 1. If the control unit establishes that a tanking operation has taken place, then the control unit conducts an investigation as to whether negative effects are to be feared on the metering of fuel to air with respect to the lambda value because of a possible change in the fuel composition. This can take place as described below.

It is assumed that the precontrol values for the lambda control for operating the engine with gasoline are applicable. The precontrol values can be adapted with the aid of an adapted corrective value to other fuel compositions. The corresponding adaptation value in advance of tanking could have been 1.2, which means that possibly a fuel blend of approximately 80% gasoline and 20% methanol was present. Fuels which can be purchased can be gasoline and a blend of 20% gasoline and 80% methanol. The possible composition of the fuel after tanking is dependent upon the ratio of the level P2 and P1 and the possible compositions of the tanked fuel.

From the mentioned values, the control unit computes which fuel composition could possibly be present. It is assumed that the most unfavorable possible new composition can require a change of the injection times of more than several percent. In this case, the control unit 6 investigates whether the engine 3 is already so warm that the control unit can balance out the corresponding adaptation of the injection times by means of adaptive lambda control. If this is not the case, then the control unit controls the switchover valve 11 such that the switchover valve connects the output of the reservoir 8 with the pump 9. After tanking, the reservoir is still completely filled with fuel as it was present before tanking. The pump 9 then pumps, as before, fuel of the old known composition. The control unit continues to investigate whether adaptive lambda control can be enabled for the engine 3.

As soon as this is the case, the control unit 6 controls the switchover valve 11 into the position shown in the drawing; that is, in that position in which the pump 9 pumps fuel from the tank 1 via the intake filter 12. The fuel metering device 2 now receives fuel of the new composition which makes new injection times necessary. These injection times are computed with the aid of a rapid adaptive lambda control.

The return line 5 functions to again fill the reservoir which was partially emptied in the above described operation. As soon as the reservoir is entirely filled, fuel presses through a vent tube 16 from the reservoir into the tank 1. In this way, fuel can continue to flow into the reservoir 8 as a returning component flow as it is pumped from the tank 1 so that after a time, the reservoir will have the same fuel composition as the tank. This assures that after retanking, the sequence described above can take place again.

The control unit is so configured that it only switches the switchover valve 11 so that fuel is drawn by suction from the tank 1 when the engine is adequately operationally warm. For this reason, the danger is present that the reservoir 8 can be pumped empty if an unexpectedly long time passes until an adequate operational warmth of the engine has been reached or when several warm-up phases take place because of short trips without the engine being adequately warm. In order to in this case preclude a standstill of the engine 3, a level sensor 14 mounted near the base of the reservoir 8 emits a signal when the fuel level in the reservoir 8 has dropped to the level of the level sensor 14. In this case, the control unit 6 switches the switchover valve 11 for drawing fuel from the tank even when the engine 3 is not adequately warm for adaptive lambda control.

The embodiment described can be modified in various ways. The level sensor 14 can, for example, drive the switchover valve 11 directly. The level sensor 13 can be configured as desired and must not have a float 17 as shown in the drawing. The pump 9, the switchover valve 11 and the reservoir 8 can be mounted outside rather than inside the tank 1. The pump 9 need not be a pump which is switched on and off by turning on the ignition key and pumping continuously when switched on with complete output. Instead, the pump 9 can be configured as a requirement-orientated pump. If there is no return line for a system with such a pump, a strongly choked partial intake flow can be used to fill the reservoir.

It should be mentioned that control unit 6 preferably activates the switchover valve even when the engine is warm so that the pump 9 is connected to the reservoir 8 when the fill level sensor 13 indicates that the tank 1 is empty. At the same time, a warning lamp 18 lights to tell the driver that fuel from the reservoir is already being used and this should actually be kept full of fuel in order that fuel of the old composition is available after tanking for the longest possible operating time.

When the fuel composition is adapted, the valve is controlled to switch from tank fuel to reservoir fuel as needed when the tank fuel level is low and the fuel sloshes away from the suction filter due to driving maneuvers.

It is understood that the foregoing description is that of the preferred embodiments of the invention and that various changes and modifications may be made thereto without departing from the spirit and scope of the invention as defined in the appended claims.

What is claimed is:

1. A system for supplying fuel to an internal combustion engine having an air intake, the system comprising:
   a metering device for metering fuel to the intake air;
   a tank for receiving fuel from outside of said system;
   a reservoir for fuel including means to prevent fuel from entering said reservoir while said tank receives fuel from outside of said system;
   fuel pump means for pumping fuel to said metering device,
   switchover valve means movable between a first position wherein said valve means connects said reservoir to said fuel pump means so as to permit fuel to be pumped from said reservoir to said metering device and a second position wherein said valve means connects said tank to said fuel pump means so as to permit fuel to be pumped from said tank to said metering device;
   control means for driving said fuel pump means and said metering device; and,
   said control means being adapted for actuating said switchover valve means into said first position when the engine is cold and for actuating said switchover valve means into said second position when said engine is warm.

2. The system of claim 1, further comprising return line means operatively connected to said pump means for conducting a portion of the fuel pumped by said pump means into said reservoir.

3. The system of claim 2, said return line means being a return line communicating with said fuel pump means for conducting said portion of fuel to said reservoir as a return flow.

4. The system of claim 1, said control means including adaptation means having a first mode of operation wherein adaptation is inhibited when the engine is cold and a second mode of operation wherein adaptation is enabled when the engine is warm.

5. The system of claim 1, further comprising a level sensor for measuring the level of the fuel in said tank; and, said control means being adapted to conduct a check as to whether the level of fuel in said tank has changed by more than a predetermined amount; and, if such a change has occurred, estimating the composition of the fuel in said tank which could possibly be most disadvantageous for metering into said intake air; and, switching said switchover valve means into said second position even when the engine is cold when the estimated composition differs less than a predetermined difference from the composition assumedly present in the tank before the level in the tank increased.

6. The system of claim 5, further comprising a level sensor mounted in said reservoir for emitting a signal when said reservoir is empty; and, said control means being adapted to switch said switchover valve means into said second position in response to said signal even when the engine is cold.

* * * * *